Oct. 3, 1933.   H. G. WEYMOUTH   1,929,130
PROTECTIVE COUPLING FOR GAS METERS
Filed Dec. 21, 1929
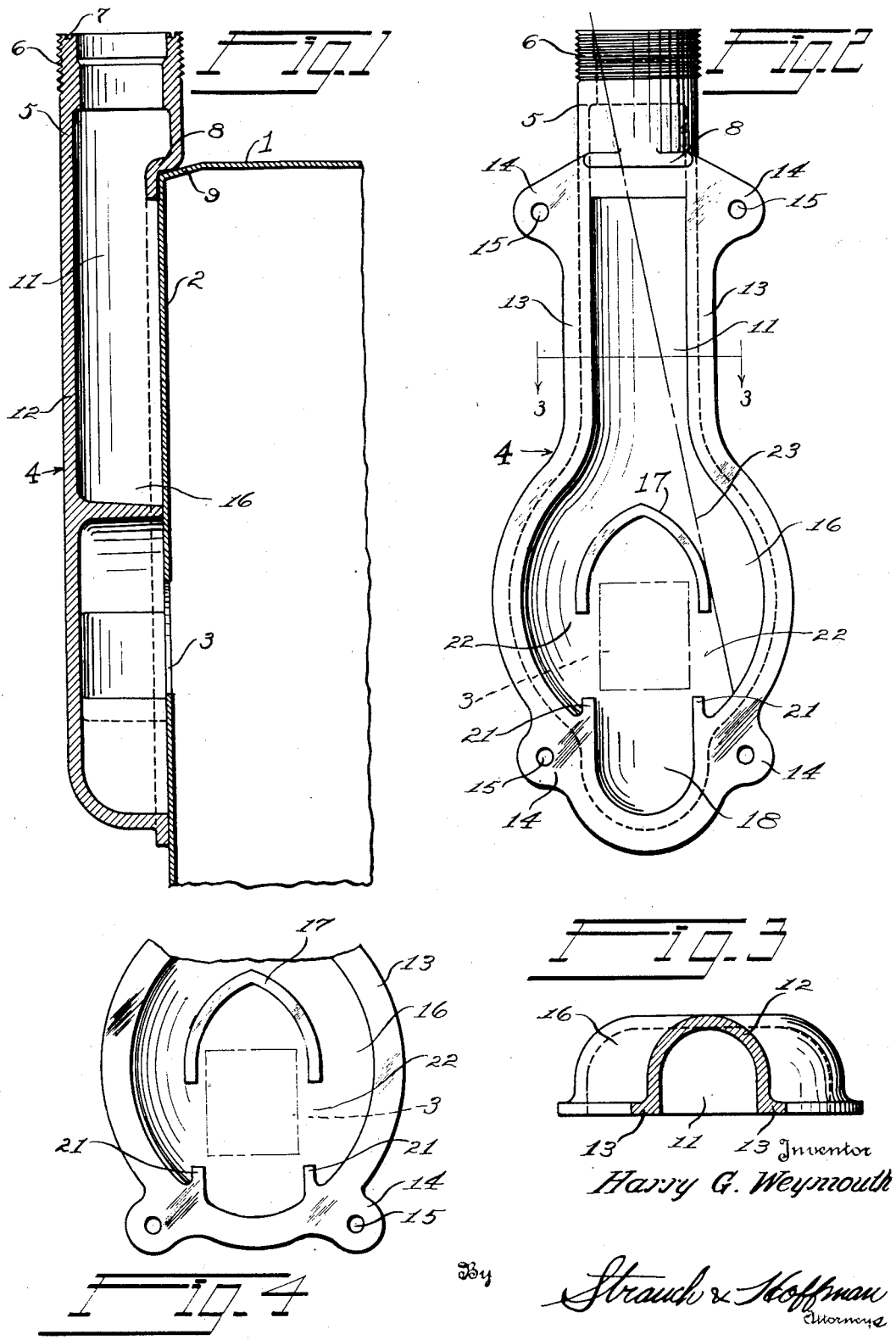

Patented Oct. 3, 1933

1,929,130

UNITED STATES PATENT OFFICE 1,929,130

PROTECTIVE COUPLING FOR GAS METERS

Harry G. Weymouth, Pittsburgh, Pa., assignor to Pittsburgh Equitable Meter Company, Pittsburgh, Pa., a corporation of Pennsylvania Application December 21, 1929
Serial No. 415,717

1 Claim. (Cl. 73—1)

This invention relates to a protective coupling for gas meters, and, more particularly, to a coupling wherein the insertion of wire or similar foreign matter into the meter through the coupling for fraudulent purposes is prevented.

It is known to some users of meters that it is possible to seriously interfere with the operation of a valved gas meter by the insertion of a wire or similar device, to prevent the metering and registering mechanism from properly operating to register the quantity of gas actually passing through the meter. With the usual type of coupling member for the inlet and outlet of the gas, it is possible to insert a wire so that it may enter the gas meter, and either hold the valves open and prevent the operation of the counting mechanism or otherwise seriously impair or retard the operation of the counting mechanism whereby the register associated with the meter will not correctly register the total flow.

It is an object of this invention therefore to provide a simple coupling member for use with a gas meter with means therein to prevent the insertion of wires or the like to the meter mechanism.

Prior to this invention it has been proposed to provide protective devices in the inlet and outlet couplings of gas meters to prevent the insertion of wires, such protective devices including baffles, shields or the like, but such prior constructions have been either expensive to manufacture and troublesome to install, ineffective in their operation, or have provided serious obstructions in the flow of gas to and from the meter. In modern installations today wherein the various gas consumers are supplied with gas from a central plant, the tendency is to reduce the pressure in the gas main. In some modern installations today the pressure in the gas main is as low as three ounces per square inch. Clearly therefore, any obstruction in the path of flow of the gas will seriously interfere with the proper delivery of gas to the consumer.

Another object of this invention therefore is to provide a protective coupling for gas meters having means therein for effectively preventing the insertion of wires and the like into the meter, and being so designed that the gas may pass freely and smoothly to and from the meter without any sharp decrease or increase in pressure thereof at any point.

In prior constructions to prevent the insertion of a wire through the inlet or outlet of a gas meter, some attempts have been made to use wire deflecting baffles. Such baffles have not been effective, however, for the following reasons. If a wire is inserted it first impinges on the baffle and then upon being forced further into the coupling, the wire begins to bend, sometimes bending about the baffle itself, or sometimes about the walls of the tubular coupling. With wire thus bent, further insertion thereof accompanied sometimes by a twist of the wire, will result in the end of the wire entering the meter.

Another object of this invention, therefore, is to provide a coupling for a gas meter in which the wire deflecting baffle is so shaped and spaced from the surrounding walls that it is impossible to bend an inserted wire about the baffle, and the inserted wire will be merely deflected to a point adjacent a wire-intercepting pocket.

Another object of this invention is to provide a protective coupling of the above type which is cheap and easy to manufacture, simple to install, and thoroughly effective in its operation.

These and various other objects of the invention will be apparent from the following description and the appended claim when taken in connection with the accompanying drawing wherein:

Figure 1 is a sectional view through one corner of a gas meter showing my improved coupling member connected thereto.

Figure 2 is a front elevation of my coupling member disassociated from the meter.

Figure 3 is a section taken substantially on line 3—3 of Figure 2.

Figure 4 is a broken elevation of a modified form of coupling.

In Figure 1 is shown a fragmentary section of a gas meter having the top wall 1 and the side wall 2, with an opening 3 in the side wall for the passage of gas to or from the meter. It is the usual practice to provide a unitary coupling member for association with the side of the meter to which coupling member the gas conduit or pipe is removably attached.

My coupling member comprises an open-sided member 4, the upper end of which is cylindrical and screw-threaded on its exterior surface as at 6 for the reception of a detachable coupling member. The upper face of the portion 5 has a groove 7 therein for the reception of a compressible gasket in order that the connection with the gas pipe may be tight. Beneath the cylindrical portion 5, one wall of the coupling is provided with an inwardly projecting shoulder 8 against which the upper corner 9 of the meter casing 1 is adapted to be received. Beneath the shoulder 8 the coupling member is cut away to provide a passage-way 11 which has an open side facing toward the meter wall 2. The semi-cylindrical wall 12 of the passage-way 11 has outwardly extending flanges 13 on each side thereof, the flanges 13 at the upper end thereof adjacent the cylindrical portion 5 having outwardly extending lugs 14, which lugs are perforated as at 15 for the reception of securing bolts or rivets.

The open-sided passage-way 11 merges into an enlarged chamber 16 which is also open-sided and is bounded by a continuation of the outwardly extending flanges 13. From an inspection of Figure 2 it will be seen that the passage-way 11 and the chamber 16 gradually merge one into the other, the connecting wall being so curved that there are no obstructions or sharp projections placed in the path of the flowing gases.

Positioned approximately centrally within the chamber 16 is a baffle member 17 which comprises an outwardly and downwardly flaring member. The wall of the baffle member 17 extends outwardly to approximately the full depth of the coupling member, as seen in Figure 1, into contacting engagement with the wall 2 of the meter. The outwardly and downwardly flaring portion of the baffle 17 extends to approximately the full width of the passage-way 11, as seen in Figure 2, and said baffle is spaced beneath the lower end of passage 11.

The bottom of the chamber 16 has a communicating sump 18 extending downwardly from said chamber 16, and integral projections 21 extend upwardly into chamber 16 adjacent the point of communication between the chamber and the sump 18.

In the manufactured gas as used today there are inevitably small quantities of liquid suspended in the gas, which liquid is carried forward and is sometimes condensed in the gas pipe and in the gas meter. The sump 18 is for the purpose of receiving the condensed liquid which otherwise would enter the meter and interfere with the operation of the moving parts thereof.

With the parts constructed and arranged as above described, the protective coupling is secured to the side of the meter 2 as shown in Figure 1, with the entrance 3 through said wall for the gas positioned directly below the baffle 17 and above the sump 18. The coupling member is usually soldered to the meter casing, the coupling being hot tinned before machining to facilitate the soldering operation. Suitable bolts or rivets are also positioned in openings 15. The opening 3 is shown in dot and dash lines in Figure 2 to indicate the relative position of the parts. When a gas conduit is connected to the threaded portion 6 of the coupling, gas passing either in or out of the meter by the opening 3 is first impinged against the baffle 17 and the direction thereof is changed, whereby any entrained liquid is condensed and will collect in the sump 18.

It will be noted that the projections 21 are fixed beneath and approximately in alignment with the downwardly flaring walls of the baffle 17, thus providing openings 22 between said projections and said baffle, through which the gases must pass to move into the chamber 16 and through the passageway 11.

It is very desirable in a device of this character that the moving gas remain under substantially constant pressure without sharp increases or decreases thereof, since in some modern installations as above pointed out the pressure in the gas main is extremely low. Obviously therefore if the gas is retarded in its movement and the pressure is thus decreased or increased, the flow of gas is detrimentally affected. In applicant's design of coupling as above described, the above faults are avoided by a careful design as to the relative size and positions of the various ports and passage-ways through which the gas passes.

It will be noted that the opening 3 through the wall 2 of the meter is approximately of the same area as the total cross-sectional area of the two openings 22 between the projections 21 and the baffle 17. Also the cross-sectional area of the passage-way 11 is approximately equal to the cross-sectional area of opening 3.

By providing the port and passage-ways of the cross-sectional areas above described the gas which enters the coupling by way of opening 3 remains at the same pressure throughout its travel through the coupling and therefore the flow of the gas is smooth and uninterrupted.

Another important feature of this invention lies in the size and the positioning of the baffle 17 in chamber 16 with relation to the lower open end of the passage-way 11. As seen in Figure 2, a straight wire 23 inserted through the open end 5 of the coupling at an angle to the passage-way 11 may be run in contact with or tangent to either side walls of the baffle 17, and the end thereof will touch the wall of the chamber 16 below the baffle and adjacent the projections 21. By this means the wire which is attempted to be inserted into the meter remains straight until it contacts with the wall of chamber 16 adjacent the pocket formed by each of the projections 21. Any further movement inward of the wire results in the ends of the wire being caught in the pockets and curled or bent upon itself, and insertion of the wire through the opening 3 of the meter is practically impossible.

If a wire is run straight down through the passage-way 11 it will encounter the curved surfaces of the baffle 17 and be deflected toward the side wall of the chamber 16 in a manner similar to the wire 23 shown on Figure 2. Thus it is impossible to make the wire bend around the baffle or around any portion of the coupling except within the pocket formed by the projection 21. It will be noted that the lower end of a wire 23 which is inserted in the coupling so that the wire intersects or touches the inner edge of the wall at the upper end of the passageway in the coupling member, shown at 6, and tangent to the baffle member 17, contacts with the lower wall of the chamber 16 above projection 21 as shown in Figure 2 of the drawing.

The modification shown in Figure 4 is quite similar to that shown in Figures 1 to 3 with the exception that the sump 18 is omitted. The inner walls of the chamber 16 form a continuous curve at the bottom thereof in this modification, the projections 21 being extended upwardly in approximately the same relative position as that shown in Figure 2. It has been found in many installations that the collection of moisture at the bottom of the coupling is not sufficient to warrant the provision of a separate sump, such as shown in Figures 1 to 3, and the chamber 16 suffices to collect the condensed moisture. The relative size and shape of the parts of this modification are otherwise the same as in Figures 1 to 3.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim is therefore intended to be embraced therein.

What I claim and desire to secure by United States Letters Patent is:—

In combination with a gas meter having an inlet port in the side wall thereof, a coupling comprising an upright member adapted to have a gas conduit connected to its upper end, and having an upright elongated passageway and an enlarged chamber communicating with said passageway at the lower end thereof and with the inlet port of said meter, downwardly inclined bottom walls in said chamber, a downwardly flared baffle located in said chamber immediately above said port and spaced from said chamber walls sufficiently to permit a straight wire to be inserted into said chamber and abut a bottom wall thereof without bending, the inclination of said bottom walls being such as to gradually bend the end of said wire downwardly on continued insertion, and baffles located at the ends of said bottom walls below said inlet port and forming pockets with the bottom walls to entrap the end of said wire.

HARRY G. WEYMOUTH.